United States Patent [19]

Ishida et al.

[11] Patent Number: 4,753,129
[45] Date of Patent: Jun. 28, 1988

[54] STEERING WHEEL CORE METAL

[75] Inventors: Syuichi Ishida, Ichinomiya; Kenichi Sawada, Kounan, both of Japan

[73] Assignees: Toyoda Gosei Co., Ltd.; Ichiei Kogyo Co., Ltd., both of Nishikasugai, Japan

[21] Appl. No.: 922,835

[22] Filed: Oct. 23, 1986

Related U.S. Application Data

[63] Continuation of Ser. No. 730,573, May 6, 1985, abandoned.

[30] Foreign Application Priority Data

May 7, 1984 [JP] Japan ............................... 59-66878[U]

[51] Int. Cl.⁴ ........................ B62D 1/04; G05G 1/10; B21D 39/00; B23P 11/00
[52] U.S. Cl. ................................. 74/552; 29/159 B; 29/517; 403/284
[58] Field of Search .................................. 74/552-558; 29/159 B, 510, 517; 403/274, 284, 300

[56] References Cited

U.S. PATENT DOCUMENTS

| 1,031,515 | 7/1912 | Bluemel | 74/552 |
| 1,412,678 | 4/1922 | Dover | 29/159 B |
| 1,801,283 | 4/1931 | McManus | 74/552 |
| 1,854,780 | 4/1932 | Bronson | 74/552 |
| 1,967,060 | 7/1934 | Mungen | 74/552 |
| 2,146,703 | 2/1939 | Husted | 74/552 |
| 2,311,317 | 2/1943 | Tegarty | 74/552 |
| 2,852,843 | 9/1958 | Banta et al. | 29/517 |
| 2,948,170 | 8/1960 | Kemp | 29/517 |
| 3,738,885 | 6/1973 | Lecomte | 74/552 |
| 4,011,644 | 3/1977 | Muller et al. | 74/552 |
| 4,241,490 | 12/1980 | Edwards | 29/517 |
| 4,662,238 | 5/1987 | Zeller | 74/552 |

FOREIGN PATENT DOCUMENTS

| 431293 | 3/1925 | Fed. Rep. of Germany | 74/552 |
| 1283688 | 11/1968 | Fed. Rep. of Germany | 74/552 |
| 1630307 | 7/1971 | Fed. Rep. of Germany | 74/552 |
| 2100437 | 8/1972 | Fed. Rep. of Germany | 74/552 |
| 3442784 | 6/1985 | Fed. Rep. of Germany | 74/552 |
| 2418731 | 9/1979 | France | 29/159 B |
| 2432418 | 2/1980 | France | 74/552 |
| 2486007 | 1/1982 | France | 74/552 |
| 2502092 | 9/1982 | France | 74/552 |
| 546935 | 8/1942 | United Kingdom | 74/552 |
| 2037682 | 7/1980 | United Kingdom | 74/552 |
| 2040243 | 8/1980 | United Kingdom | 74/552 |

Primary Examiner—Gary L. Smith
Assistant Examiner—Vinh Luong
Attorney, Agent, or Firm—Cushman, Darby & Cushman

[57] ABSTRACT

A steering ring core is fabricated by telescopically assembling into a ring a plurality of arcuate alternating solid connecting elements and tubular steering ring elements and welding radiating spoke elements at their outer ends to the solid connecting elements. The steering ring elements are secured to the connecting elements by squeeze-forming respective portions of the steering ring elements into external indentations formed in the connecting elements.

8 Claims, 2 Drawing Sheets

STEERING WHEEL CORE METAL

This is a continuation of application Ser. No. 730,573, filed May 6, 1986, which was abandoned upon the filing hereof.

BACKGROUND OF THE INVENTION

1. Field of the Invention

The present invention relates to a metal core for a steering wheel, to be used for automobiles, and more specifically to a steering wheel core in which a plurality of metal pipe core elements in circular arc form are connected by connecting metal core elements of a prescribed number whereby a ring core is formed, and spoke cores are connected at respective radially outer ends to the connecting core elements of the ring core and at respective radially inner ends to a boss plate.

2. Description of the Prior Art

In such a steering wheel metal core of the prior art, a part of a ring core is formed a by pipe so as to make the metal core lighter in weight, a plurality of pipe core elements in circular arc form are connected by connecting core elements of a prescribed number, and thereby a ring core is formed. In this case, connection of the pipe core elements with the connecting core elements has been performed in a process in which the pipe core elements are arranged outside the connecting core elements and end circumferential surface of each pipe core element is welded to each connecting core element.

However, simultaneous welding of the whole circumference at ends of the pipe core elements is difficult because the welding may be obstructed by other portions. Consequently, the whole circumference is divided into three or the like during the welding. For example, when the ring core is composed of the three pipe core elements, the connecting core elements also become three in number and each pipe core element is welded at both ends. That is, the six portions must be welded by dividing in three respectively and therefore the process number becomes large for the connection.

Since welding is utilized in order to connect the pipe core elements to the connecting core elements, both core elements cannot be connected to each other if both are made of different materials, for example, if the connecting core elements are made of iron and the pipe core elements are made of aluminium to make the core metal lighter in weight.

SUMMARY OF THE INVENTION

An object of the invention is to provide a metal core for a steering wheel in which caulking (i.e. squeeze-forming, such as crimping) is utilized in order to connect the pipe core elements with the connecting core elements. The number of process required for manufacturing the ring core is not large, and the pipe core elements and the connecting core elements can be connected to each other even if both of the types of core elements are made of different materials.

The above object can be attained by the invention in that each recess is formed in a connecting core element at a connecting portion radially outside of which a respective pipe core element is to be arranged. That pipe core element is arranged outside the connecting portion of the respective connecting core element and caulked (i.e. squeeze-formed) into the recess of the connecting portion, and as a plurality of the pipe core elements in circular arc form are connected in a like manner, a ring core is formed.

Further in a steering wheel metal core according to the invention, when a pipe core element is caulked (i.e. squeeze-formed) into the recess portion in a respective pipe core element, the end of the pipe core element may be narrowed smoothly in a tapered or curved surface manner towards the outer circumferential surface of the recess so as to form the ring core. In such constitution of the ring core, when a coating layer of soft plastic material is formed on outer circumference of the ring core by means of injection molding after formation of the steering wheel metal core, the molding material flows smoothly over all of the outer circumference of the ring core, thereby generation of an uneven luster or a weld mark on the outer surface of the coating layer can be reduced.

DESCRIPTION OF THE PREFERRED EMBODIMENTS

Figure 1:
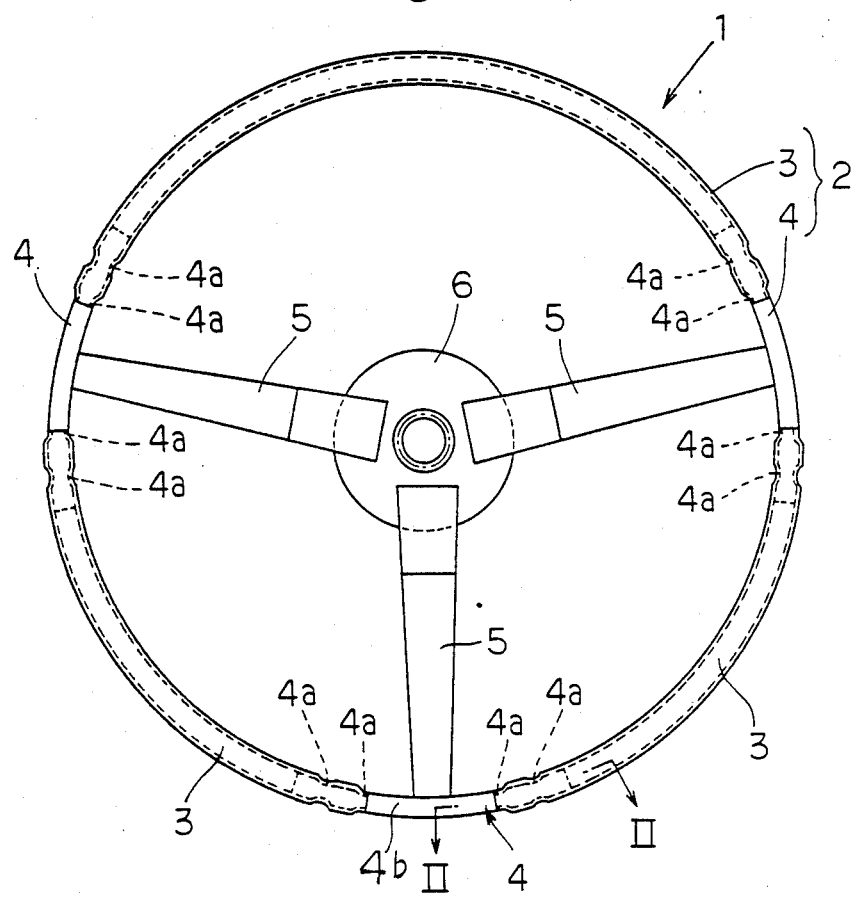
FIG. 1 is a plan view of a steering wheel metal core of a first embodiment of the invention.
Figure 2:
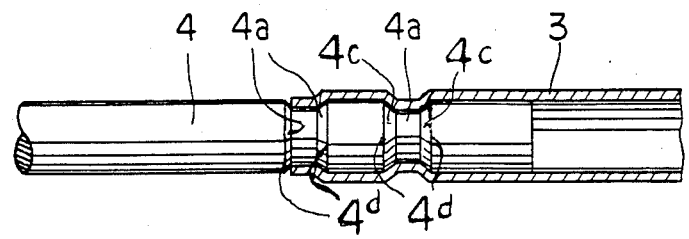
FIG. 2 is a sectional view taken in line II—II of FIG. 1.

In a first embodiment as shown in FIG. 1 and FIG. 2, a steering wheel metal core 1 comprises a boss plate 6 of iron, three flat spoke cores 5 of iron welded at their radially inner ends with the boss plate 6, and a ring core 2 welded with radially outer ends of the spoke cores 5.

The ring core 2 is composed of three pipe core elements (i.e. ring core elements) 3 in circular arc form and three solid connecting core elements 4 to connect the pipe core elements 3 into ring form. The radially outer end of each spoke core 5 is welded with each connecting core element 4. Each pipe core element 3 is made of aluminium in consideration of lightening in weight, and each connecting core element 4 is made of iron in consideration of welding with the respective spoke core 5.

Each connecting core element 4 is formed as an arcuate member, provided on its opposite arms 4b, 4b near both ends thereof with radially outwardly opening recesses (i.e. indentations) 4a of annular groove form, two per end. The ends of each pipe core element 3 are arranged radially outside the portions of the respective connecting core elements where the recesses 4a are provided and caulked (i.e. squeeze formed) into the portions including the recesses, through the mouths of the recesses, thereby fixedly connecting the pipe core elements 3 to the respective connecting core elements 4.

Each connecting core element 4 has the four recesses 4a having sides 4c which diverge outwardly to respective mouths 4d and therefore use of the three connecting core elements 4 requires squeeze-forming actions to be performed at twelve sites. In order to manufacture the ring core 2, the pipe core elements 3 are arranged radially outside the portions of the respective connecting core elements where the recesses 4a, thereby assembling the pipe core elements and the connecting core elements 4 into ring form. The connecting core elements are then caulked (i.e. squeeze-formed) to a corresponding jig, in one caulking operation. Thus, the number of process steps needed for manufacturing the ring core 2 may be reduced and the cost is lowered.

Since caulking (i.e. squeeze-forming) is utilized to connect the pipe core elements 3 with the connecting core elements 4, both types of core elements can be fixedly connected to each other even if they are made of different materials.

After the ring core 2 is manufactured as above described, the ring core 2, the boss plate 6 and the spoke cores 5 are set into a prescribed jig in a conventional manner, and each spoke core 5 is welded at its respective ends with the boss plate 6 and the connecting core element 4 of the ring core 2, thus further completing manufacture the steering wheel metal core 1.

Although each connecting core element 4 in the first embodiment is formed near both ends with recesses 4a of annular groove form at two portions per end, the recesses 4a may be formed at one portion per each end as long as the pipe core elements 3 can be securely connected by squeeze-forming, to the respective connecting core elements.

Figure 3:
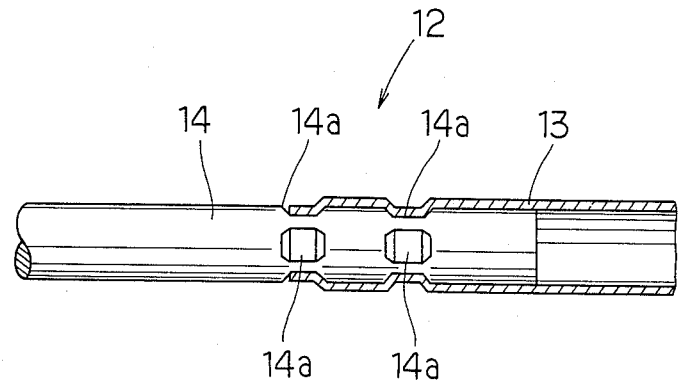
FIG. 3 is a partial sectional view of a steering wheel metal core of a second embodiment.

Referring to the second embodiment shown in FIG. 3, each connecting core element 14 may be formed on outer circumference near both of its ends with recesses 14a being not in annular form but sunk at prescribed portions. Each pipe core element 13 may then be arranged outside the sunk portions on respective connecting core elements and caulked (i.e. squeeze-formed) therewith so as to form a ring core 12.

Figure 4:
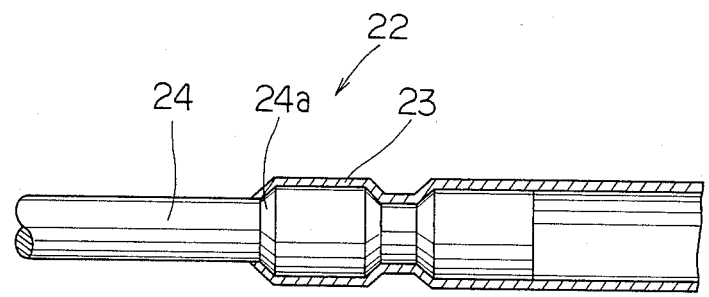
FIG. 4 is a partial sectional view of a steering wheel metal core of a third embodiment.

Further, referring to the third embodiment shown in FIG. 4, when a pipe core element 23 is to be caulked (i.e. squeeze-formed) at both ends, it may be narrowed smoothly in a tapered or curved surface manner to the outer circumferential surface of a respective recess 24a of a respective connecting core element 24 so as to form a ring core 22. In such a type of construction, if a coating layer of soft plastic material is formed by injection molding on outer circumference of the ring core 22 after forming the steering wheel metal core, the molding material flows smoothly towards the outer circumference of the ring core 22 so that the generation of an uneven luster or a weld mark on the outer surface of the coating layer can be reduced.

In addition, although a circular cross-section is shown in the drawings for the pipe core elements 3, 13, 23 and the connecting core elements 4, 14, 24 of the first through third embodiments, it may be square or trigonometric other than circular.

Although the connecting core elements 4, 14, 24 disclosed in the first through third embodiments preferably is solid, it may be hollow as long as the welding with the spoke core can be performed satisfactorily.

What is claimed is:

1. A steering wheel core, comprising:
   a plurality of arcuate steering ring core elements each of which extends through an arc of less than half a circle, about a common longitudinal axis; each such element having two angularly opposite ends which are disposed to project oppositely from one another angularly about such circle;
   a corresponding plurality of generally radially directed spoke core elements, each of which thus has a radially outer end and a radially inner end;
   a central boss core means;
   means securing each said spoke core element in the vicinity of said radially inner end thereof, to said central boss core means so that each spoke core element has said radially outer end thereof disposed in the vicinity of a respective spacedly adjacent two of said ends of a respectively spacedly adjacent two of said arcuate tubular steering ring core elements about said circle;
   a corresponding plurality of arcuate connecting core elements each having two angularly-opposite ends;
   weld means securing each said connecting core element intermediate said ends thereof to a respective spoke core element in the vicinity of the radially outer end of the respective said spoke core element;
   each said connecting core element including two angularly opposite arms which are disposed to project oppositely from one another angularly about said circle, each such arm having a respective said connecting core element end;
   each said arm of said connecting core elements being fixedly telescopically related with a respective said end of a respective said arcuate steering ring core element;
   means mechanically securing each said arm in said fixed telescopic relation with a respective said end of said steering ring core element, this mechanically securing means comprising a squeeze-formed mechanical joint between the respective said arm and the respective said steering ring core element end with which such arm is fixedly telescopically related;
   in the instance of each said squeeze-formed mechanical joint:
      the respective said steering ring core element adjacent and leading to the respective said end thereof being tubular so as to telescopically receive therewith the respective said arm;
      said arm being externally indented so as to provide at least one radially outwardly opening indentation therein;
      said steering ring core element adjacent the respective said end thereof being squeeze-formed into said at least one indentation, thereby mechanically securing said arm and ring core element;
      said at least one indentation of each said squeeze-formed mechanical joint being constituted by a plurality of individual indentations;
      such individual indentations of each said squeeze-formed mechanical joint including some which are spaced from one another arcuately along the circumferential direction of said circle; and
      such individual indentations of each said squeeze-formed mechanical joint including some which are spaced from one another arcuately along a transverse cross-section of said circle.

2. The steering wheel core of claim 1, wherein:
the said spoke core elements and connecting core elements are made of ferrous metal and the said steering ring core elements are made of aluminous metal.

3. The steering wheel core of claim 1, wherein:
said steering ring core elements, said spoke core elements and said connecting core elements are made of metal.

4. The steering wheel core of claim 3, wherein:
in the instance of each said squeeze-formed mechanical joint:
   each said indentation broadens toward a mouth thereof so as to present a less sharp external surface transition with such arm beside such indentation.

5. A steering wheel core, comprising:

a plurality of arcuate steering ring core elements each of which extends through an arc of less than half a circle, about a common longitudinal axis; each such element having two angularly opposite ends which are disposed to project oppositely from one another angularly about such circle;

a corresponding plurality of generally radially directed spoke core elements, each of which thus has a radially outer end and a radially inner end;

a central boss core means;

means securing each said spoke core element in the vicinity of said radially inner end thereof, to said central boss core means so that each spoke core element has said radially outer end thereof disposed in the vicinity of a respective spacedly adjacent two of said ends of a respectively spacedly adjacent two of said arcuate tubular steering ring core elements about said circle;

a corresponding plurality of arcuate connecting core elements each having two angularly-opposite ends;

weld means securing each said connecting core element intermediate said ends thereof to a respective spoke core element in the vicinity of the radially outer end of the respective said spoke core element;

each said connecting core element including two angularly opposite arms which are disposed to project oppositely from one another angularly about said circle, each such arm having a respective said connecting core element end;

each said arm of said connecting core elements being fixedly telescopically related with a respective said end of a respective said arcuate steering ring core element;

means mechanically securing each said arm in said fixed telescopic relation with a respective said end of said steering ring core element, this mechanically securing means comprising a squeeze-formed mechanical joint between the respective said arm and the respective said steering ring core element end with which such arm is fixedly telescopically related;

in the instance of each said squeeze-formed mechanical joint:
the respective said steering ring core element adjacent and leading to the respective said end thereof being tubular so as to telescopically receive therewith the respective said arm;

said arm being externally indented so as to provide at least one radially outwardly opening indentation therein;

said steering ring core element adjacent the respective said end thereof being squeeze-formed into said at least one indentation, thereby mechanically securing said arm and ring core element;

said at least one indentation of each said squeeze-formed mechanical joint being constituted by a plurality of individual indentations;

such individual indentations of each said squeeze-formed mechanical joint including some which are spaced from one another arcuately along the circumferential direction of said circle; and such individual indentations of each said squeeze-formed mechanical joint including some which are spaced from one another arcuately along a transverse cross-section of said circle; and each of said at least one indentation comprising two outwardly opening annular grooves in each respective said arm, each such groove extending circumferentially of the respective said arm and each respective two such annular grooves being spaced angularly of said circle from one another on the respective said arm.

6. The steering wheel core of claim 5, wherein:
the said spoke core elements and connecting core elements are made of ferrous metal and the said steering ring core elements are made of aluminous metal.

7. The steering wheel core of claim 5, wherein:
said steering ring core elements, said spoke core elements and said connecting core elements are made of metal.

8. The steering wheel core of claim 7, wherein:
in the instance of each said squeeze-formed mechanical joint:
each said indentation broadens toward a mouth thereof so as to present a less sharp external surface transition with such arm beside such indentation.

* * * * *